United States Patent [19]

Singer et al.

[11] Patent Number: 6,082,312
[45] Date of Patent: Jul. 4, 2000

[54] HAND-GUIDED APPLIANCE WITH AN INTERNAL COMBUSTION ENGINE WITH DIRECT ELECTRONIC INJECTION

[75] Inventors: Andreas Singer, Fraureuth; Jochen Schoenhaar, Hamburg; Klaus Matthees, Freiberg; Walter Siepmann, Chemnitz; Peter Schulz, Pleissa; Uwe Mehlhose, Chemnitz, all of Germany

[73] Assignee: Dolmar GmbH, Hamburg, Germany

[21] Appl. No.: 09/155,934

[22] PCT Filed: Apr. 14, 1997

[86] PCT No.: PCT/EP97/01845

§ 371 Date: Mar. 8, 1999

§ 102(e) Date: Mar. 8, 1999

[87] PCT Pub. No.: WO97/39228

PCT Pub. Date: Oct. 23, 1997

[30] Foreign Application Priority Data

Apr. 12, 1996 [DE] Germany .................. 96U2006668

[51] Int. Cl.[7] ........................................ F01P 1/02
[52] U.S. Cl. ................................ 123/41.52; 123/41.65
[58] Field of Search .......................... 123/41.52, 41.63, 123/41.65, 73 C, 73 CB, 65 BA

[56] References Cited

U.S. PATENT DOCUMENTS

| | | | |
|---|---|---|---|
| 4,370,855 | 2/1983 | Tuggle ........................ | 123/41.65 |
| 4,438,733 | 3/1984 | Sasaki . | |
| 5,231,956 | 8/1993 | Lux et al. .................. | 123/41.65 |
| 5,267,536 | 12/1993 | Imagawa et al. .......... | 123/41.65 |
| 5,269,265 | 12/1993 | Pretzsch et al. ........... | 123/41.65 |
| 5,317,997 | 6/1994 | Tomitaku . | |
| 5,367,988 | 11/1994 | Collins ...................... | 123/41.65 |
| 5,526,777 | 6/1996 | Taomo et al. .............. | 123/41.65 |
| 5,533,869 | 7/1996 | Garrison et al. ........... | 123/41.65 |
| 5,542,380 | 8/1996 | Chatten ...................... | 123/41.65 |
| 5,626,105 | 5/1997 | Locke et al. ............... | 123/41.65 |
| 5,775,271 | 7/1998 | Compagnucci ............ | 123/41.65 |
| 5,934,257 | 8/1999 | Ishikawa et al. .......... | 123/73 C |

FOREIGN PATENT DOCUMENTS

| | | | |
|---|---|---|---|
| 2 657 398 | 6/1991 | France ................. | F02D 43/00 |
| 37 35 711 A1 | 5/1989 | Germany ............. | F02M 69/10 |
| 41 42 354 A1 | 6/1993 | Germany ............. | F02M 39/02 |
| 93 09 436 U | 11/1994 | Germany ............. | F02M 21/02 |

*Primary Examiner*—Erick Solis
*Attorney, Agent, or Firm*—McCormick, Paulding & Huber LLP

[57] ABSTRACT

In a manually operated machine such as a chain saw or the like, an internal combustion engine (10) located in a housing (17) and having an associated fuel injection mechanism (70) and an electro-mechanical module (80) is used to drive the machine. The engine (10) is a two-cycle one having a fuel container (140) arranged in or on the housing (17). The fuel injection mechanism in addition to the fuel container includes an injection valve (20) and a connecting tube (21) connecting the fuel container with the valve. For the connection between the outlet (22) of the injection valve (20) and the engine (10), a capillary tube (27) is used whose cross-sectional diameter is at maximum five times the cross-sectional diameter of the outlet of the injection valve, and the capillary tube is formed into the shape of a spring with its outlet opening directed into the engine block. The electro-mechanical module (80) contains means (25) for producing the drive voltage and a control circuit (26) with which the injection valve (20) is electrically connected.

12 Claims, 2 Drawing Sheets

HAND-GUIDED APPLIANCE WITH AN INTERNAL COMBUSTION ENGINE WITH DIRECT ELECTRONIC INJECTION

TECHNICAL AREA

The invention relates to a hand-operated tool, more particularly cutting disks, brush cutters or the like, with an internal combustion engine, preferably a two-stroke engine with electronic direct injection of the fuel, which is provided with a cooling fan disposed on the crankshaft and, within the area of the cylinder, with a cooling air guidance means which brings about a flow along the crankshaft axis.

STATE OF THE ART

When fuel is injected into the internal combustion engine, it is attempted to perform this in such a way that a good mixture preparation with a simultaneous optimization of the waste gas quality is achieved.

In the DE 41 42 354 A1, a tool is disclosed which possesses a block of injection pumps that is secured to a mounting plate separating the intake section for the combustion air from the engine space. However, this leads to an increased thermal stress of the injection pump block since the latter forms a compact unit with the mounting plate so that the waste heat from the engine space is passed on direct to the parts carrying fuel, whereby a gassing of the fuel results.

Also from the DE 37 35 711 A1, a hand-operated tool is known. In this tool, the injection pump is flexibly connected with the engine so as to avoid mechanical and thermal stresses acting upon the injection pump. But it is preciselythe flexible connection which harbours new problems because the flexible pipeline makes an exact control difficult and since, on account of it being routed through non-cooled regions—close to the engine—the risk of the fuel being gassed likewise exists.

DESCRIPTION OF THE INVENTION

That is why the technical problem of the invention is to optimize two-stroke internal combustion engines of the type in question or their fuel injection.

This technical problem is resolved by the features characterized in the claim 1.

To this end provision is made according to the invention, particularly in power chain saws wherein the cylinder is disposed so as to be arranged vertically or inclined relative to the chain blade axis, for the intake chamber with the filter to be located on the side of the handle and for the cooling blower or fan to be mounted on the crankshaft, while a cooling air guidance means is allocated to the cylinder, this brings about a flow along the axis of the crankshaft, for a partition adjacent to the cylinder separating the continguous intake chamber from the cooling air guidance means and for disposing the fuel injection valve above the inlet duct for the drawn-in air in the cylinder, by preference with an inclination toward the cylinder head and while penetrating the partition.

Preferably, an intake section secured to the cylinder with the inlet duct, is constructed so as to overlap the fuel injection valve above the inlet duct and as a pressure element for the same.

According to a preferred embodiment, the intake section is equipped with current supply contacts for the electronically controlled fuel injection valve, in which case the intake section can incorporate the fuel supply or fuel evacuation for the electromagnetically controlled fuel injection valve.

Furthermore, the intake section may be provided with an air filter and/or an air guidance path with a device for cooling the fuel.

According to a further preferred embodiment, the intake section is equipped with a multipoint plug on an intake air housing, which also forms the partition to the cylinder, in the operational state it is in engagement, while the intake air housing possesses the controller for supplying the internal combustion engine.

More especially a power chain saw, with an internal combustion engine and a fuel injection system is often intergrated into the housing of the tool, as well as the fuel tank and a supply container for lubricating oil and the cooling air guidance means.

In fuel injection systems in motor vehicles it is known to dispose the pressure controller in the fuel tank direct or in the region of the fuel distribution on the engine in the engine space.

In a hand-controlled tool, in order to arrange the pressure controller of the fuel pipe system of the fuel injection system of the internal combustion engine in a favorable manner from a spatial, operational and cooling-technical point of view, provision is made according to the invention for disposing the pressure control valve of the fuel injection system in or on the fuel tank.

The pressure control valve is in this case preferably to be positioned in such a way that the same additionally projects into the distributor space of the cooling air or is mounted in the same.

Advantageous further developments of the invention are characterized in the subclaims.

BRIEF DESCRIPTION OF THE DRAWINGS

In the following, embodiment examples of the invention are explained in greater detail with the aid of the drawings. Thus.

BEST WAY OF REALIZING THE INVENTION

Figure 1:
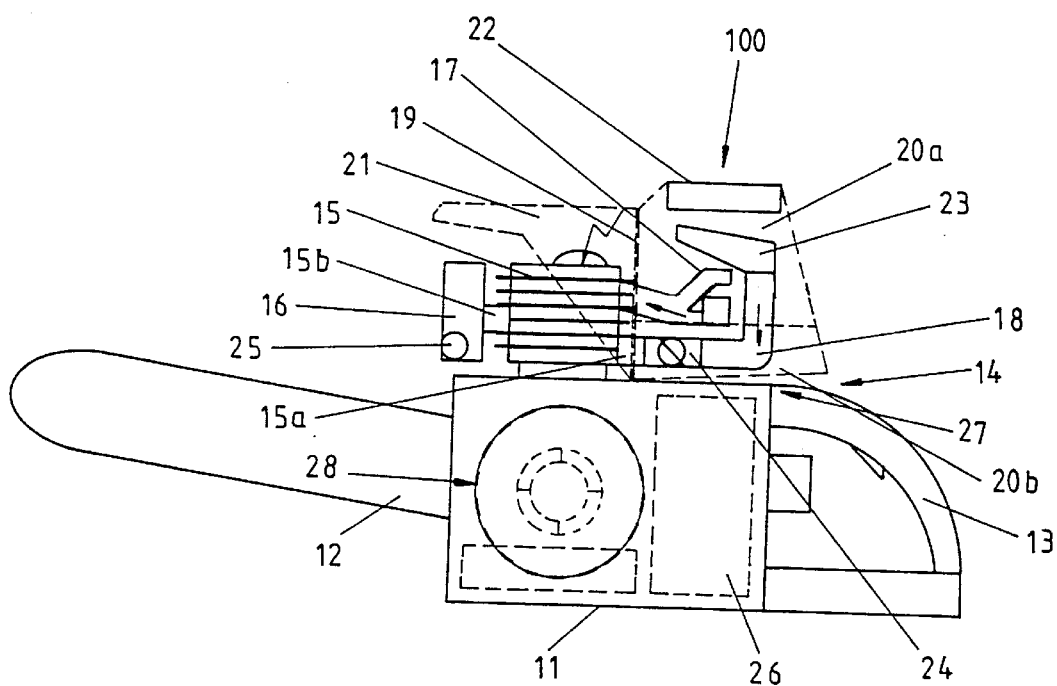
FIG. 1 shows in a schematic view a first embodiment of a power chain saw with the disposition of the pressure controller according to the invention.

The power chain saw 10 depicted in FIG. 1 is in a normal manner equipped with an internal combustion engine not shown in greater detail in a housing 11, a chain blade 12, a handle 13 and other fixtures.

On the top side 14 of the housing 11, the cylinder 15 projects, which, in the direction of the chain blade 12, supports an exhaust 16 and, in the direction of the other side, a fuel injection valve 17 and an intake section 18. Between the cylinder 15 and the fuel injection valve 17 as well as the intake section 18, a bulkhead wall 19 is located, which is constituted of an intake air housing 20 with the inlet duct 15a and the outlet duct 15b and a cooling air housing 21 for the cylinder 15, in which case the intake air housing 20 is comprised of a housing cover 20a and the housing bottom 20b.

The fuel injection valve 17 is a disposed above the intake section 18 so as to be directed obliquely upwardly, while both devices penetrate the partition 19.

The electronic controller 22 is mounted in the intake housing 20. The intake section 18 is provided with an air filter 23. The throttle valve connection piece 24 is additionally mounted in the intake section 18.

With the aid of the waste gas sensor 25 disposed within the area of the exhaust 16 or inside the outlet duct 15b of the cylinder 15, it is possible to determine the waste gas temperature for the controller 22.

An optimal operational behavior is achieved when the fuel pump not shown in the drawing in or on the fuel tank 26, is disposed in the intake air stream 27 or in the cooling air stream 28.

Figure 2:
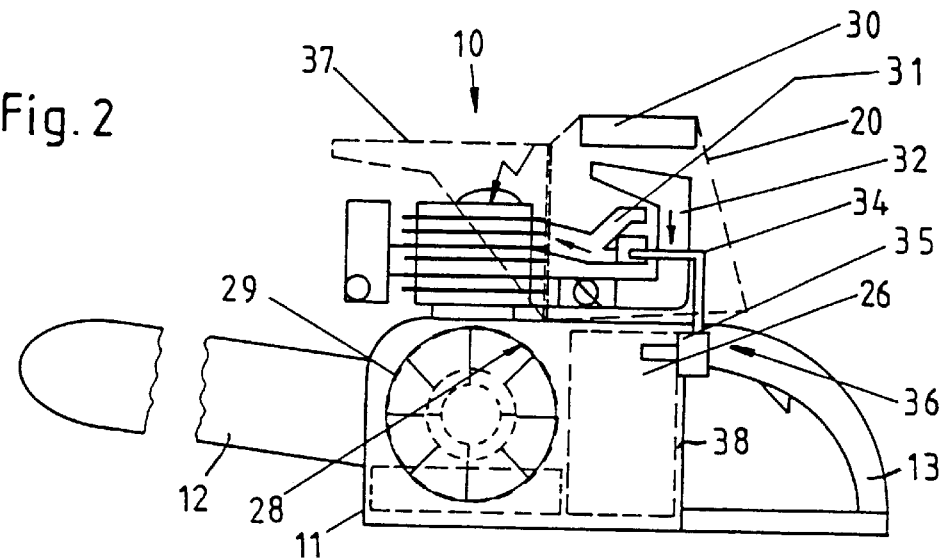
FIG. 2 shows in a schematic view a second embodiment of a power chain saw with the disposition of the pressure controller according to the invention.
Figure 3:
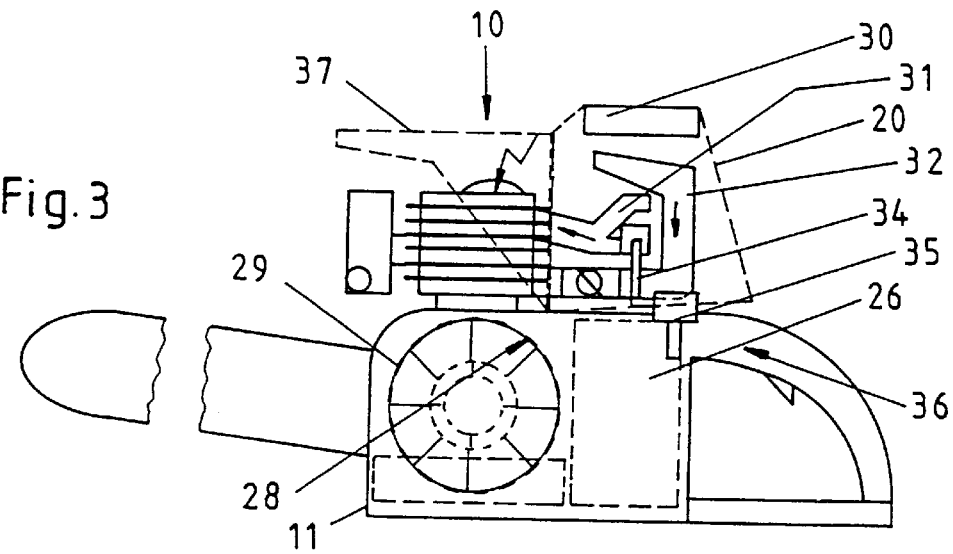
FIG. 3 shows in a schematic view a third embodiment of a power chain saw with the disposition of the pressure controller according to the invention.
Figure 4:
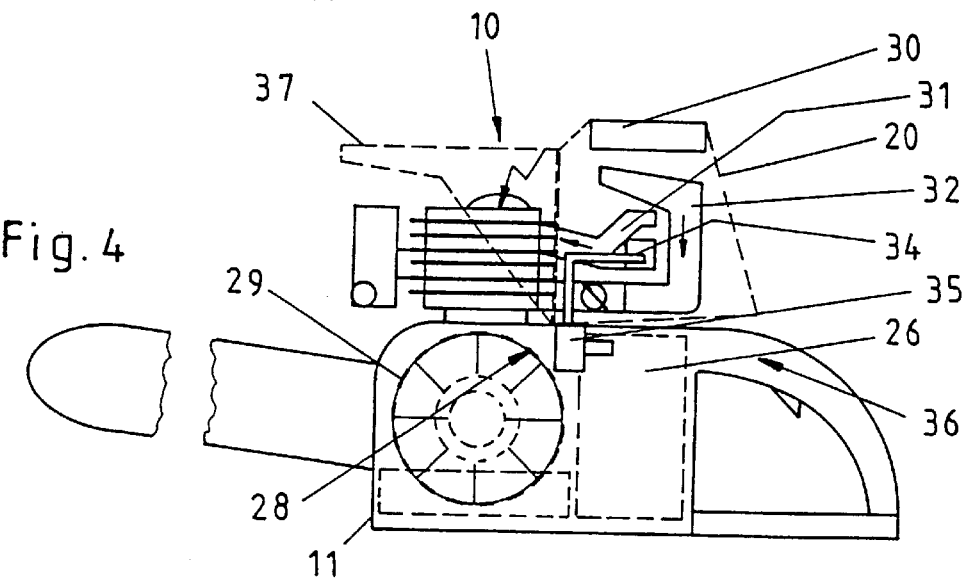
FIG. 4 shows in a schematic view a fourth embodiment of a power chain saw with the disposition of the pressure controller according to the invention.

The power chain saw 10 depicted in the FIGS. 2 through 4 is comprised of a basic housing 11, on which a handle 13 and the chain blade 12 are disposed. Inside the basic housing 11, the fuel tank 26, a supply container for lubricating oil, the cooling air guidance means and the internal combustion engine are located, which are not illustrated in greater detail here as well as other normal means. Located on the basic housing 11 or, rather, projecting from the same, is the cylinder 15, on which the magnetic injection valve 31 as well as a means for the intake of combustion air are disposed.

The fuel tank 26 is provided on the side 38 of the basic housing 11 located opposite the chain blade 12 within the area of the handle 13. The pressure controller 35 is placed in the basic housing 11, to be more precise, in that part, in which also the fuel tank 26 is to be found.

In the embodiment depicted in FIG. 2, in the intake air housing 20 mounted on the basic housing 11, the intake section 32 with the fuel return pipe 34, an electronic controller 30 and the magnetic injection valve 31 are disposed.

The pressure controller 35 of the fuel injection system is, according to the invention, disposed externally on the fuel tank 26 in the intake air stream 36. The air stream 29 is produced by the magnet wheel/fan wheel 28 and conducted from the basic housing 11 to the cooling air housing 37.

In the embodiment illustrated in the FIG. 3, in contrast to the embodiment shown in the FIG. 2, provision has been made for the pressure controller of the fuel injection system to be disposed on the exterior of the fuel tank 26 in the intake air stream 36 and this, according to the invention, so as to project into the intake air housing 20.

In the embodiment depicted in FIG. 4 on the other hand, provision has been made for the pressure controller 35 for the fuel injection system to be disposed on the fuel tank 26, which is integrated into the basic housing 11.

LIST OF REFERENCE NUMBERS

Power chain saw 10
housing 11
chain blade 12
handle 13
top side 14
cylinder 15
cylinder inlet duct 15a
cylinder outlet duct 15b
exhaust 16
fuel injection valve 17
intake section 18
bulkhead wall 19
intake air housing 20
intake air housing, cover 20a
intake air housing, bottom 20b
cooling air housing 21
electronic controller 22
air filter 23
throttle valve connection piece 24
waste gas sensor 25
fuel tank 26
intake air stream 27
cooling air stream 28
magnet wheel/fan wheel 29
electronic controller 30
magnetic injection valve 31
intake section 32
fuel return flow pipe 34
pressure controller 35
intake air stream 36
cooling air housing 37
side 38

What is claimed is:

1. A hand-guided tool with a two-stroke internal combustion engine with an electronically controlled fuel injection system having a fuel injection valve and a pressure controller, with a cooling blower mounted on the crankshaft, with a cylinder with intake and outlet ducts, and with a cooling air guidance means in the vicinity of the cylinder which brings about an air flow along the axis of the crankshaft, wherein:

a bulkhead wall runs along the cylinder and separates an adjacent intake air housing with an air intake section from the cooling air guidance means, the intake air housing channels air into an intake air stream when the engine is running, the fuel injection valve is disposed above the cylinder intake duct so as to penetrate the bulkhead wall, and said pressure controller of the fuel injection system is located in said intake air stream.

2. A hand-guided tool according to claim 1, wherein: the fuel injection valve is installed so as to be inclined toward a cylinder head on the cylinder.

3. A hand-guided tool according to claim 1, wherein: the fuel injection valve has an injection duct located opposite the side of the outlet duct of the cylinder and above the inlet duct of the cylinder.

4. A hand-guided tool according to claim 1, wherein: the intake section serves for accommodating the fuel handled by the fuel injection valve.

5. A hand-guided tool according to claim 1, wherein: the intake section is provided with an air filter and an air guidance path with a means for cooling the fuel.

6. A hand-guided tool according to claim 1, wherein: the fuel injection valve projects into the intake air housing and, in the region of the bulkhead wall, is provided with a sealing element.

7. A hand-guided tool according to claim 1, wherein: the bulkhead wall, within the region of the penetration of the fuel injection valve, is configured with a convexity.

8. A hand-guided tool according to claim 1, wherein: the intake air housing is comprised of a bottom and a cover, said cover carrying an electronic controller for the fuel injection valve.

9. A hand-guided tool according to claim 1, wherein: the intake air housing is provided with the bulkhead wall.

10. A hand-guided tool according to claim 1, wherein: the intake air housing is, in its interior, provided with control wiring for the fuel injection valve.

11. A hand-guided tool according to claim 1, wherein: the intake section serves to accommodate control wiring for the fuel injection valve.

12. A hand-guided tool according to claim 1, wherein: a throttle valve connection piece is constructed so as to accommodate an intake air temperature sensor.

* * * * *